E. SCHRÖDER.
METHOD OF WORKING ELECTRIC RESISTANCE WELDING MACHINES OPERATING WITH CONTINUOUS CURRENT.
APPLICATION FILED JAN. 13, 1917.

1,428,262.

Patented Sept. 5, 1922.

UNITED STATES PATENT OFFICE.

EDMUND SCHRÖDER, OF BERLIN, GERMANY, ASSIGNOR, BY MESNE ASSIGNMENTS, TO THE CHEMICAL FOUNDATION, INC., A CORPORATION OF DELAWARE.

METHOD OF WORKING ELECTRIC RESISTANCE WELDING MACHINES OPERATING WITH CONTINUOUS CURRENT.

Application filed January 13, 1917. Serial No. 142,235.

*To all whom it may concern:*

Be it known that I, EDMUND SCHRÖDER, a subject of the German Emperor, and resident of Berlin, in the German Empire, have invented a new and Improved Method of Working Electric Resistance Welding Machines Operating with Continuous Current, of which the following is a specification.

Heretofore it has been customary to feed transformers from continuous current mains by subdividing this current into single rushes by means of a suitably constructed interrupter, especially of the hammer type. But interrupters of this kind are not employable where the current is of rather great strength, such, for instance, as is necessary for the operation of resistance welding machines. In such cases it is practically impossible to operate the interrupter without sparks. In the resistance welding process it is particularly important to have an accurately working interrupter, because the work must be done very often by unskilled hands.

My invention consists in making use, in connection with the electric resistance welding process, of the known property of such interrupters as, for instance, gas-filled interrupters of the turbine type, or interrupters of the Simon type, to interrupt currents of considerable strength without the production of sparks even in uninterrupted service. The interrupters are employed, according to my invention, for directly feeding the transformers.

Figure 1:
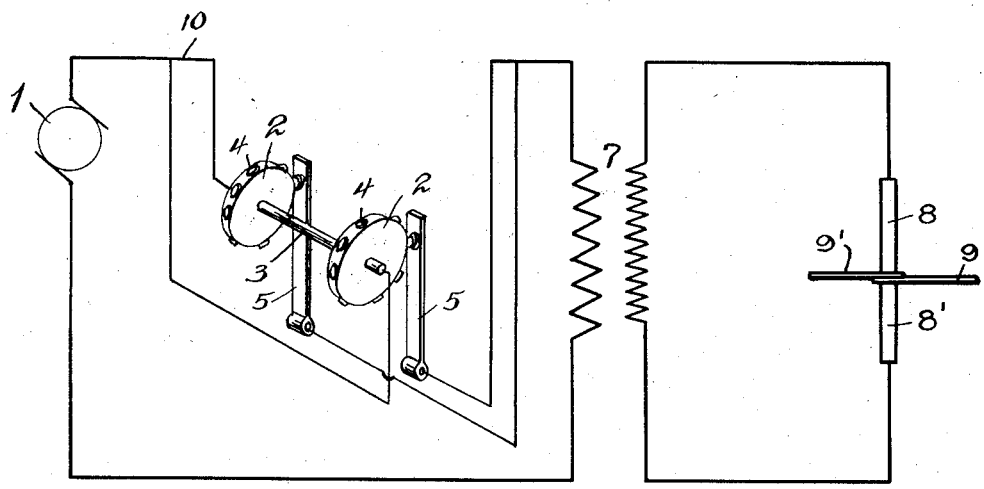
Figure 2:
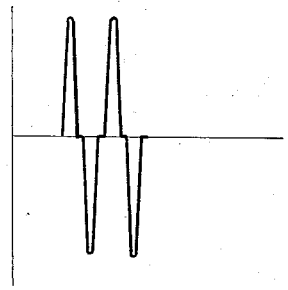

The accompanying drawing shows, diagrammatically, an illustrative embodiment of my invention, by means of which the method may be performed; and therein Figure 1 is a diagrammatic view showing in complete assembly the various parts and connections comprising said embodiment; and Figure 2 is a graphical representation of the induced welding current.

In accordance with the foregoing embodiment of my invention, a source of electrical energy 1 is directly connected to the primary of the welding transformer 7 through an interrupter 2, which may be of the turbine type, the periphery of which carries a plurality of conducting protuberances 4 which are connected by conductors to the main lead wire 10. The secondary of the transformer is connected directly with the electrodes 8 and 8', which serve to make the weld between the plates of metal 9 and 9', for example.

The interrupter is mounted upon a shaft 3, which is in mechanical contact with suitable driving means, said driving means being capable of regulation in order that the current pulses per unit of time may be varied at will. Upon the periphery of the rotating drum are placed the plurality of conducting protuberances 4 already referred to, and which may, as before stated, be insulated by an atmosphere of gas. These protuberances, by intermittently contacting with an opposed protuberance 6 carried by an arm 5, occasion a very abrupt rise of the current from zero to the maximum, and then an equally abrupt fall from the maximum to zero, thus obviating burning the metal being welded and setting up an intense current quickly and with minimum losses.

The almost instantaneous rise of the current to its maximum intensity and its abrupt fall to zero is shown by the graph comprising Fig. 2.

Many of the disadvantages of the method as hitherto practiced are obviated by the above-described improvement. There are no great no-load losses caused by sets of converters, far less space is required, and the cost of the plant is greatly reduced by substituting comparatively cheap and light interrupters for the expensive and heavy converters.

It must be admitted that the serviceableness of the interrupters in their usual form of construction is limited, but any demand with respect to strength of the current and complete avoidance of sparks may be met either by coupling two or more interrupters in parallel (electrically or mechanically), by employing a single interrupter with a plurality of nozzles, or, finally, by coupling two or more interrupters of the last mentioned type.

Having now described my invention, what I desire to secure by a patent of the United States is:

1. An electric resistance welding system utilizing continuous current, comprising an interrupter positioned directly between the source of electrical energy and the welding transformer, said interrupter being adapted to operate substantially without sparks.

2. An electric resistance welding system utilizing continuous current, comprising a plurality of interrupters adapted to operate substantially without sparks, said interrupters being coupled in parallel and positioned directly between the source of electrical energy and the welding transformer.

3. An electric resistance welding system utilizing continuous current, comprising a plurality of interrupters adapted to operate substantially without the formation of sparks, said interrupters being mechanically coupled in parallel and positioned directly between the source of electrical energy and the welding transformer.

4. An electric resistance welding system utilizing continuous current comprising an interrupter having a plurality of conducting protuberances said interrupter being positioned directly between the source of electrical energy and the welding transformer.

5. An electric resistance welding system utilizing continuous current, comprising a plurality of interrupters coupled in parallel, each of said interrupters having a plurality of conducting protuberances, said interrupter being positioned directly between the source of electrical energy and the welding transformer.

In witness whereof I have hereunto signed my name this twenty-fifth day of October 1916, in the presence of two subscribing witnesses.

EDMUND SCHRÖDER.

Witnesses:
HENRY HARPER,
ALLEN F. JENNYS.